Patented Aug. 27, 1935

2,012,854

UNITED STATES PATENT OFFICE 2,012,854

MANUFACTURE OF CAUSTIC LIQUOR

Norman C. Hill, Saltville, Va., assignor to The Mathieson Alkali Works, Inc., New York, N. Y., a corporation of Virginia No Drawing. Application July 13, 1932, Serial No. 622,321

3 Claims. (Cl. 23—184)

Liquid caustic, that is aqueous solutions of caustic soda containing about 50% by weight of caustic soda, has some advantages, as compared to solid caustic, in specific applications, but the presence of the small amount of iron compounds almost invariably encountered in liquid caustic has involved difficulties in some applications, particularly in the manufacture of rayon and high grade soap and in mercerizing and textile work. For soap manufacture liquid caustic should contain not more than about 0.0040% of iron on the caustic soda and for rayon manufacture not more than about 0.0010%, for example.

This invention relates to an improvement in the manufacture of liquid caustic by causticization of sodium carbonate with lime for producing liquid caustic the iron content of which is below the limits which must be observed in such applications.

Various expedients have been adopted for the purpose of producing liquid caustic sufficiently free from iron for these purposes, including the use of nickel lined apparatus throughout the manufacture of the liquid caustic and the use of silver lined apparatus, but such expedients have involved unfortunate economic penalties.

This invention provides a simple and economical method of producing liquid caustic of low iron content, and, as well, of low alumina content. The invention makes possible the direct production of liquid caustic of iron content within the limits tolerable in the manufacture of rayon and soap and in mercerizing and textile work, for example.

I have found that the addition of magnesium compounds to the liquor subjected to causticization prior to separation of the calcium carbonate precipitated by or resulting from causticization results in the formation of a precipitate including magnesium compounds which precipitates, occludes, or otherwise carries with it, a large part of any iron and aluminum compounds which otherwise would be present in the caustic liquor produced. The simple subsequent separation of the precipitate produced by causticization, an operation previously necessary, thus also becomes the separation of an important part of any iron and aluminum present. The magnesium compound by which this purification is effected may be supplied to the liquor subjected to causticization as the oxide, hydroxide or any water soluble salt of magnesium. It may be supplied either directly to the liquor, or with the sodium carbonate to be causticized, or with the causticizing lime. In referring to a "water soluble salt", reference is intended to salts sufficiently soluble to react to form magnesium hydroxide when added to the liquor.

The magnesium compound may be supplied, with advantage, in proportions corresponding to about 2-5% by weight of magnesium oxide on the caustic alkali. Proportions corresponding to as much as 15% are sometimes useful. The magnesium compound may be added to the lime used for causticization, to the sodium carbonate or sodium carbonate liquor supplied to the causticization, or to the causticization receptacle during causticization, or following the causticization proper but prior to the separation of the sludge or "mud" produced by causticization. The magnesium compound may be supplied in solution, in suspension, or in solid form. Except for the supplying of the magnesium compound to effect this purification, the causticization and the separation of the precipitate produced by causticization may be carried out in the conventional manner. One way in which magnesium oxide may be supplied to effect this purification is to use, for the causticization, a lime produced by the calcination of a dolomitic limestone, or a mixture of such dolomitic lime with a lime of lower magnesia content.

Caustic liquors containing about 50% by weight of caustic soda are commonly designated "liquid caustic". The causticization of sodium carbonate with lime is sometimes carried out with the proportion of water present limited to produce such "liquid caustic". More commonly, however, the causticization is carried out with proportions of water producing caustic liquors containing about 11-12% by weight of caustic soda, from which, if desired, more concentrated liquors, "liquid caustic" for example, are produced by evaporation, for example. The improvement of the invention is not limited to causticization operations in which the proportion of water present is limited to any particular value. It is applicable to causticization operations generally for the production of less concentrated as well as more concentrated caustic liquors.

While the invention has been described with particular reference to the production of caustic liquors consisting of aqueous solutions of caustic soda, it is also applicable to the production of aqueous solutions of caustic potash of low iron and alumina content by causticization of potassium carbonate with lime. In referring to "caustic liquors" in the appended claims, the term is intended to include aqueous solutions of caustic potash as well as aqueous solutions of caustic soda.

I claim:

1. In the manufacture of caustic liquor by causticization of sodium carbonate with lime, the improvement which comprises adding to the liquor to be subjected to causticization and prior to separation of the calcium carbonate precipitated by causticization, lime and a purifying reagent, the proportion of purifying reagent being relatively minor with respect to the amount of lime, said purifying reagent being selected from the group consisting of the oxide, hydroxide and water soluble salts of magnesium, and separating the sludge produced by causticization including precipitated magnesium compounds from the thus produced caustic liquor.

2. In the manufacture of caustic liquor by causticization of an alkali metal carbonate with lime, the improvement which comprises adding to the liquor to be subjected to causticization and prior to separation of the calcium carbonate precipitated by causticization, lime and a purifying reagent, the proportion of purifying reagent being relatively minor with respect to the amount of lime, said purifying reagent being selected from the group consisting of the oxide, hydroxide and water soluble salts of magnesium, and separating the sludge produced by causticization and including precipitated magnesium compounds from the thus produced liquor.

3. In the manufacture of caustic liquor by causticization of an alkali metal carbonate with lime, the improvement which comprises introducing into the liquor subjected to causticization prior to separation of the calcium carbonate precipitated by causticization, a purifying reagent selected from the group consisting of the oxides, hydroxides and water soluble salts of magnesium in proportions corresponding to 2-15% by weight of magnesium oxide on the caustic alkali.

NORMAN C. HILL.